US008850336B2

(12) United States Patent
Strenzl et al.

(10) Patent No.: US 8,850,336 B2

(45) Date of Patent: Sep. 30, 2014

(54) PRODUCTION OF A GRAPHIC USER AND/OR DISPLAY SURFACE FOR A MOTOR VEHICLE

(75) Inventors: Karl Strenzl, Germering (DE); Ralf Decke, Unterhaching (DE); Klaus Ries, Munich (DE); Frank Althoff, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1366 days.

(21) Appl. No.: 11/491,131

(22) Filed: Jul. 24, 2006

(65) Prior Publication Data

US 2007/0143695 A1 Jun. 21, 2007

Related U.S. Application Data

(63) Continuation of application No. PCT/EP2004/000670, filed on Jan. 24, 2004.

(51) Int. Cl.
*G06F 3/048* (2013.01)
*G06F 9/44* (2006.01)

(52) U.S. Cl.
CPC .................................... *G06F 8/38* (2013.01)
USPC ............ 715/762; 715/764; 715/810; 715/835

(58) Field of Classification Search
USPC .................................. 715/762, 764, 810, 835
See application file for complete search history.

(56) References Cited

U.S. PATENT DOCUMENTS 5,187,797 A * 2/1993 Nielsen et al. ................ 715/708
2003/0074634 A1 4/2003 Emmelmann
2003/0137539 A1 7/2003 Dees
2003/0137540 A1 7/2003 Klevenz et al.
2006/0010246 A1* 1/2006 Schulz et al. ................ 709/232

FOREIGN PATENT DOCUMENTS

WO WO 03/044654 A2 5/2003

OTHER PUBLICATIONS

Scalable Vector Graphics (SVG) 1.1 Specification. W3C Recommendation [online]. W3C, Jan. 14, 2003 [retrieved on Jul. 5, 2008]. Retrieved from the Internet: <URL: http://www.w3.org/TR/SVG11/REC-SVG11-20030114.pdf>.*

Microsoft Computer Dictionary, 5th ed., Redmon, Washington, Microsoft Press, 2002. p. 334. AQ76.5 M52267.*

* cited by examiner

*Primary Examiner* — Tadeese Hailu
*Assistant Examiner* — Darrin Hope
(74) *Attorney, Agent, or Firm* — Crowell & Moring LLP

(57) ABSTRACT

A method for producing a graphic user and/or display surface on a display for a man/machine interface of a motor vehicle is provided, whereby the user surface includes graphic elements that are arranged in a menu-type manner. A main group and at least one subgroup below the main group is produced and every graphic element is associated with the main group, for example the domain "com.bmw" or one of the subgroups, for example "com.bmw.entertainment", "com.bmw.enterainment.cd" or "com.bmwentertainment.radio", and the main group and the at least one subgroup indicate respective properties of the graphic elements associated therewith, for example their color. A graphic element of a subgroup has, in addition to the properties indicated in the subgroup, at least one for the most part also the properties indicated in the main group.

12 Claims, 7 Drawing Sheets

PRODUCTION OF A GRAPHIC USER AND/OR DISPLAY SURFACE FOR A MOTOR VEHICLE

CROSS REFERENCE TO RELATED APPLICATIONS

This application is a continuation of PCT International Application No. PCT/EP2004/000670, filed on Jan. 24, 2004, the entire disclosure of which is herein expressly incorporated by reference.

BACKGROUND AND SUMMARY OF THE INVENTION

The invention relates to a method, a device and a computer program product for producing a graphic user and/or display surface on a display for a man/machine interface of a motor vehicle.

The man/machine interface (MMI) of a motor vehicle is of principal importance to the driver. The increasing number of vehicle functions, their increasing complexity, for example, as a result of telematics services, and the increasing number of vehicle series and equipment variations make particularly high demands on the development of man/machine interfaces. The increasingly complex user concepts, which permit, for example, a mixture of manual and linguistic operations, or a change or adaptation of the man/machine interfaces to the respective vehicle user and/or to the respective driving or traffic situation, further increase the demands on the development of man/machine interfaces.

If the conventional development measures are retained, expenditures of time will rise to a degree that is no longer acceptable.

There is therefore needed an improved method for producing a graphic user and/or display surface on a display for a man/machine interface of a motor vehicle, the user surface having graphic elements which are arranged in a menu-type manner.

This need is met by providing a method according to the invention for producing a graphic user and/or display surface on a display for a man/machine interface of a motor vehicle. The user surface has graphic elements arranged in the form of a menu. In order to be able to change the user and/or display surface at expenditures which are as low as possible, particularly within the scope of the development of a suitable interface, a main group and at least one subgroup below the main group or below a subgroup ranked below the main group is formed. Each of the graphic elements is assigned to the main group or to one of the subgroups. The main group and the at least one subgroup each indicate properties of the graphic elements assigned to it, a graphic element of a subgroup, in addition to the properties indicated in the subgroup, also having at least predominantly the properties indicated in the main group.

As a result of the formation of main and subgroups, defined group properties may be assigned to all graphic elements of the respective group. If one or more of the properties of the concerned group are changed, the corresponding properties of all graphic elements of the concerned group will change. This takes place by a single change of the corresponding properties within the scope of the group properties; a change in the case of each element is no longer necessary. The elements of the corresponding group therefore "inherit" properties. This concept of the invention is based on the recognition that a group of graphic elements, with the exception of one or two properties, often has the same properties with respect to its graphic design. Thus, the graphic elements of one and the same group may differ, for example, only by their label.

As an alternative or in addition, it is provided in an embodiment of the invention that at least one property of the properties indicated in the main group is indicated in a subgroup in a manner deviating from the main group. According to the invention, a graphic element which is assigned to the corresponding subgroup will then not have the property defined in the main group, but rather a property deviating therefrom. It may, for example, be defined in the main group that all graphic elements which are part of the main group have a "blue" background color. Deviating therefrom, it may be defined, for example, in the case of one subgroup below the main group, that the background color of the graphic elements also assigned to this subgroup is "gray". The subgroup may, for example, be one of the menus of the man/machine interface (MMI), such as the entertainment menu, the navigation menu, the air-conditioning menu, or another menu of the MMI. A graphic element assigned to the subgroup will then have the properties defined in the main group with the exception of the property indicated in a deviating manner in the subgroup.

This inventive concept of "flexibly inheriting" or flexibly passing on properties of the graphic elements across hierarchically structured groups can naturally also advantageously be used across hierarchically structured subgroups and not just across a main group to one or more subgroups below the main group.

The concept of flexibly inheriting according to the invention has the advantage of being able to pass on a plurality of properties at low expenditures, while this is not rigidly applicable to all properties. "Exceptions from the rule" can thereby be taken into account at low expenditures. Furthermore, it is achieved by means of the concept according to the invention that changes of the properties can be implemented at low expenditures in that the property is newly defined once in the main group or in the subgroup. This leads to a change of the corresponding property of each graphic element which is assigned to the concerned main group or to the concerned subgroup. A high-expenditure change of the characteristic in the binary description or in the data of each graphic element is therefore not required.

As an alternative or in addition, it is provided in a further development of the invention that at least one of the following properties of the graphic element is indicated in the main group:

size of the element, particularly the height, width, radius or type size of the label of the element or a combination thereof;

bit maps which the element uses, particularly the background and foreground, each focused, selected, deactivated, or a combination thereof, arrows for the scrolling, focus indications;

distances, particularly of individual bit maps with respect to one another, of individual bit maps relative to the origin, of individual texts relative to the origin, or a combination thereof;

special element properties, particularly the contracting capacity of the element when not focusing, whether the element can be selected, "pressed" or focused, the scaling of bit maps, offsets of scrolling parameters of the element;

texts, particularly the text alignment, that is, whether they are right-aligned, left-aligned or centered, or the font, and/or colors, particularly the background color, the focus color, the text color, the selection color, the focusing color or the deactivating color.

As an alternative or in addition, it is provided in a further development of the invention that the graphic elements are formed on the basis of binary data elements describing them. Each binary data element is provided with an assignment indication as to which main group or subgroup the graphic element is assigned.

As an alternative or in addition, it is provided in a further development of the invention that the graphic elements are described by XML, that is, extensible markup language.

As an alternative or in addition, it is provided in a further development of the invention that the assignment of the binary data element takes place by indicating a domain as the main group and by indicating a subdomain as the subgroup, respectively.

As an alternative or in addition, it is provided in a further development of the invention that the graphic elements are displayed by using an XML-data-processing browser.

These measures advantageously permit a use of the “flexible passing-on” according to the invention of properties in the “XML technology” which is known per se and mastered. XML data can be shown, among others, also by browsers, such as the known Internet browsers. As a result, menus or MMIs can be generated in a fairly simple manner, which provide the driver with a “look and feel” which he knows from surfing the Internet by use of an Internet browser. In the case of an MMI designed in such a fashion, the driver very rapidly feels “at home” and is familiar with the MMI or with the menus.

As an alternative or in addition, it is provided in a further development of the invention that the graphic elements are described by binary data elements in an object-oriented programming language, such as, in particular, Java or C++.

It hereby becomes possible to use the concept of “inheriting properties” or the concept of “flexibly inheriting properties” according to the invention when successfully using the above-mentioned known and mastered object-oriented programming languages.

Other objects, advantages and novel features of the present invention will become apparent from the following detailed description of the invention when considered in conjunction with the accompanying drawings.

BRIEF DESCRIPTION OF THE DRAWING FIGURES

Figure 6:
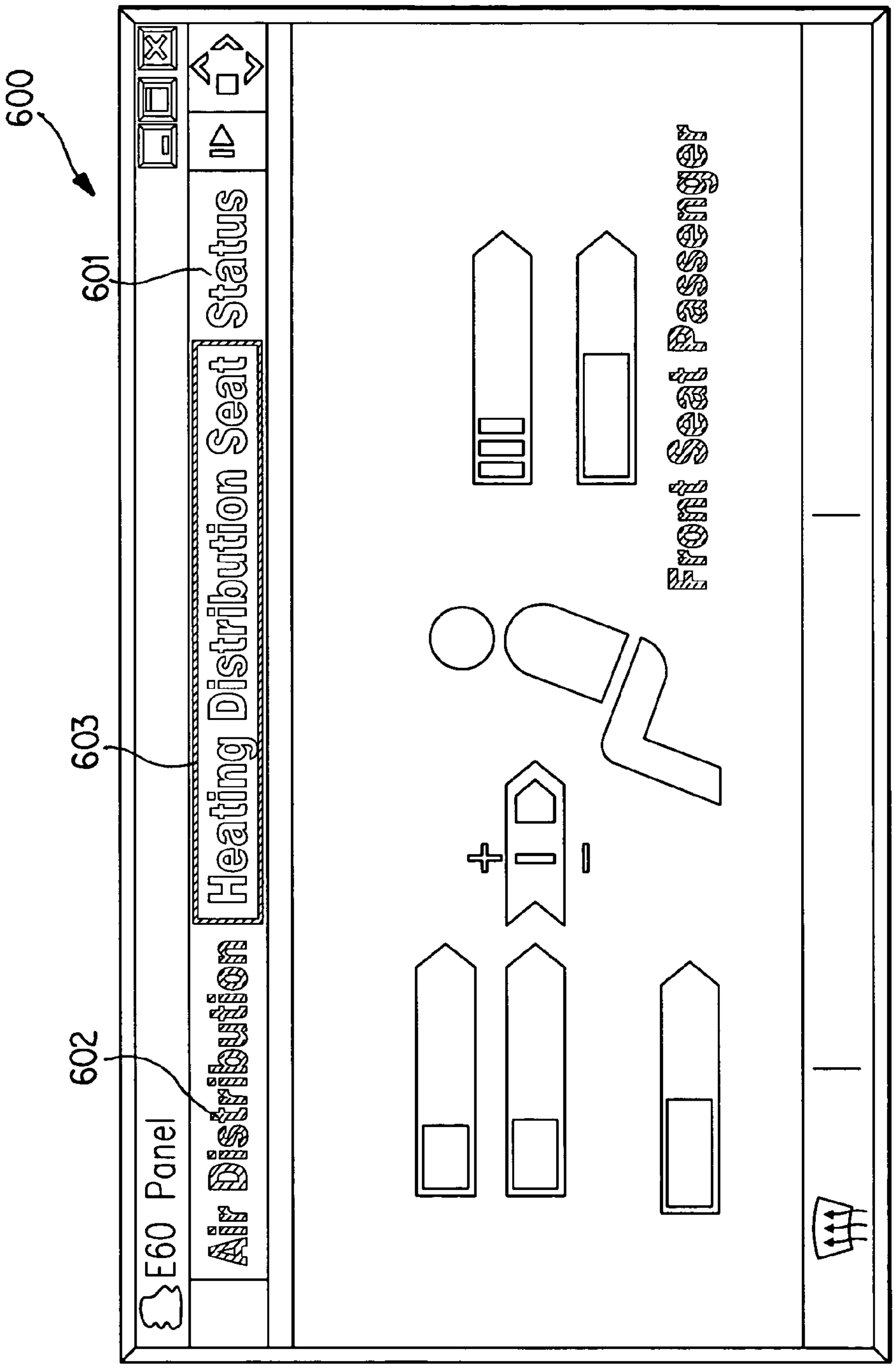
Figure 7:
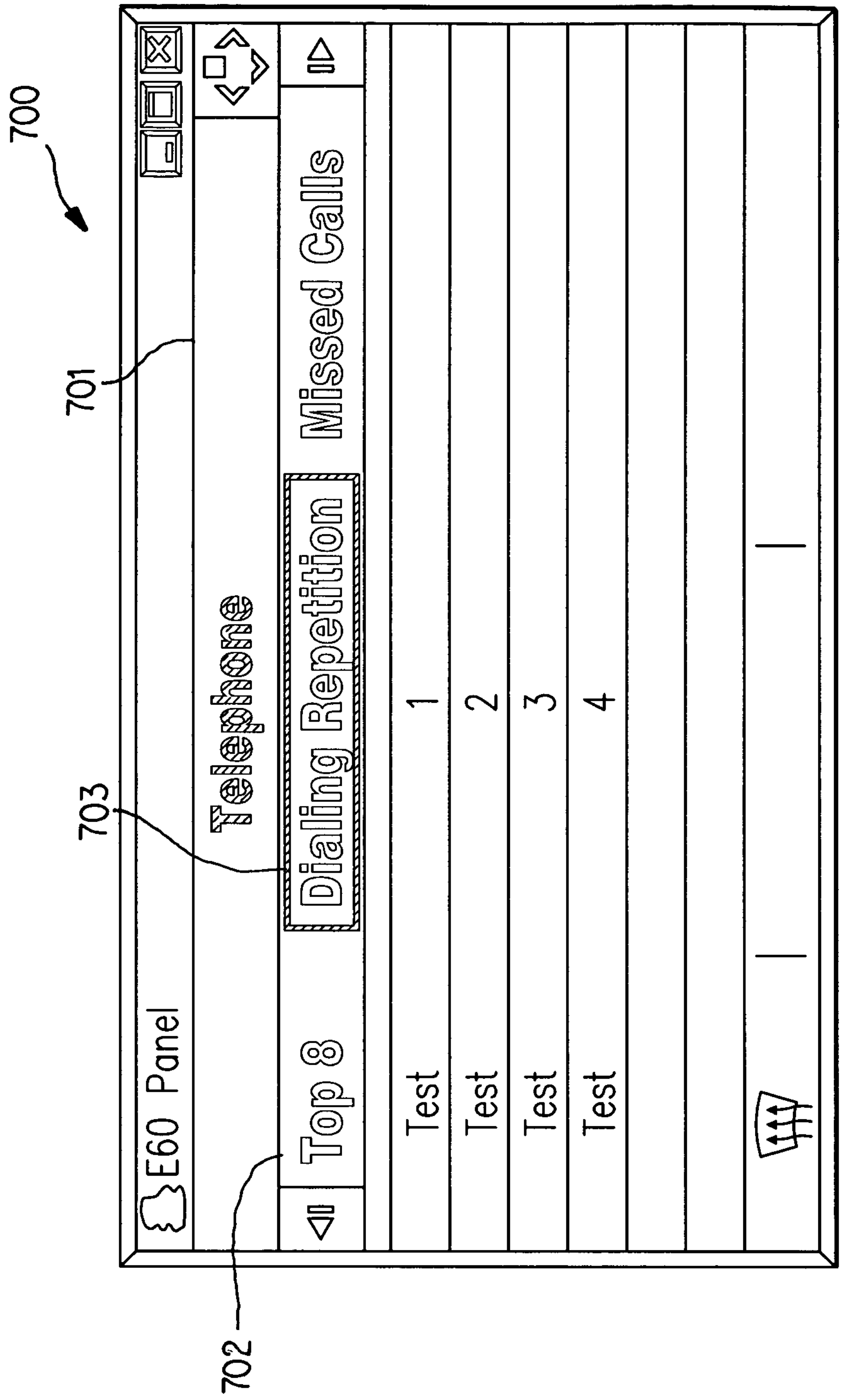

FIG. 6 is a view of the air-conditioning menu of the MMI, in which the focus color in the “horizontal list” element was changed from “red” to “green”; and FIG. 7 is a view of the “Top 8” menu of the communication menu as an additional example of the fact that the change of the focus color from “red” to “green” in the “horizontal list” element is also implemented in all other menus of the MMI with a single change in the XML description of the “horizontal list” element.

DETAILED DESCRIPTION OF THE DRAWINGS

The change of the color design in the “horizontal list” element 101, 201, 301, 401, 501, 601, 701 in menus 100, 200, 300, 400, 500, 600, 700 of a man/machine interface (MMI) for a motor vehicle by using XML technology is described in detail in the embodiment.

By means of the following XML prototype language, the focus color of the graphic “horizontal list” element 101, 201, 301, which is described or defined in a binary manner by the “MmiListHorizontal” prototype, is set to “red”; see below “<property color red=“255” green=“0” blue “0” name=colorSelected”/>.

```
<!- - +++++++++++++++++++++++++++++++++++++++++++++++++++++
                                                    MmiListHorizontal
      +++++++++++++++++++++++++++++++++++++++++++++++++++++++ -- >
<prototype uimsGUITupe=”MmiListHorizontal” domain=”com.bmw”>
   <propertyCollection>
      <location x=”0.0” y=”0.0”/>
      <size width=”400.0” height=”30.0”/>
      <! additional properties are indicated at this point which
were, however, omitted for a simplified representation -- >
      < ! - focus is set to red - - >
      <propertycolor      red=”255”    green=”0”    blue=”0”
      name=”colorSelected”/>
   </propertyCollection>
</prototype>
```

Figure 1:
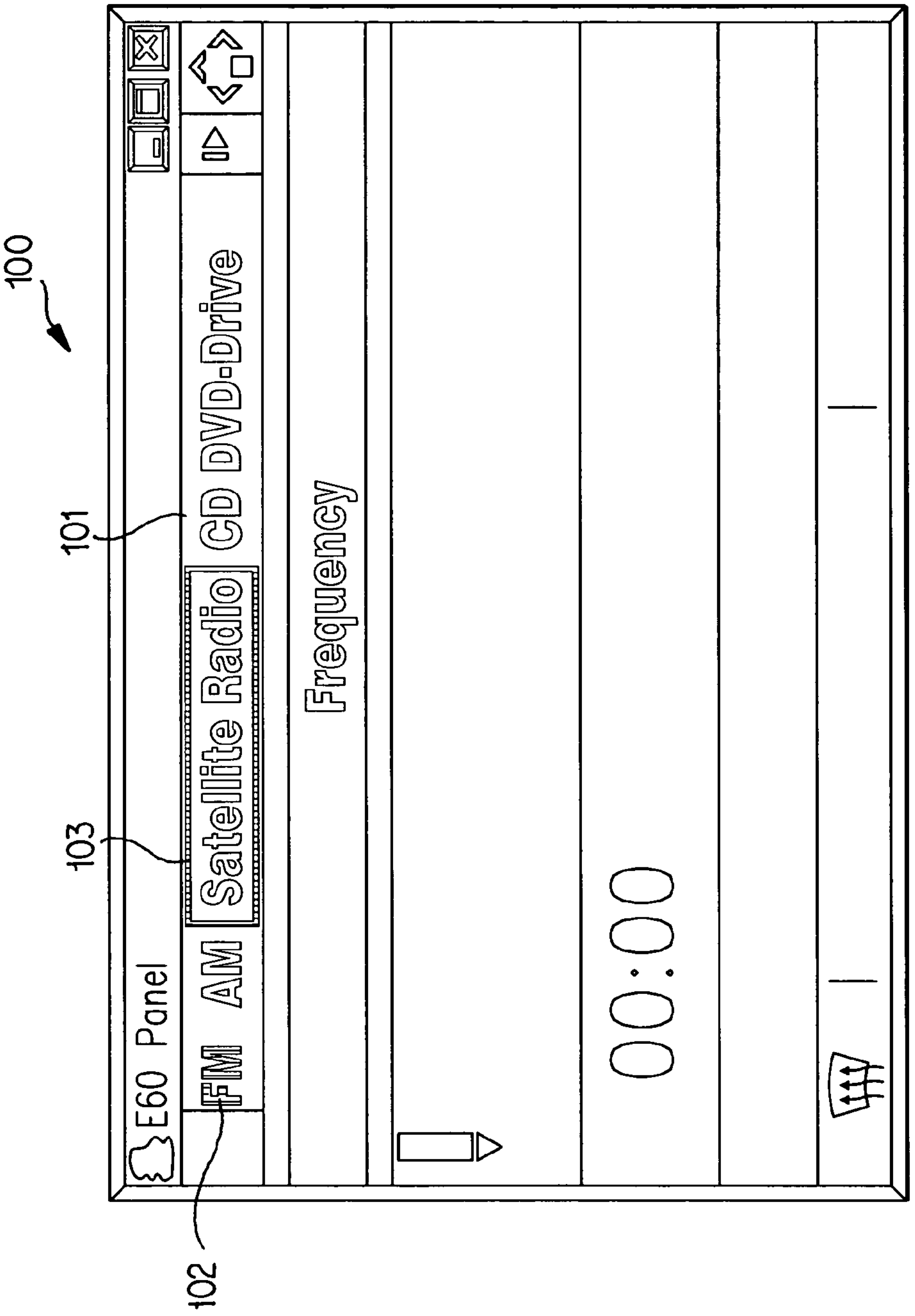
FIG. 1 is a view of an entertainment menu of an MMI, in which the focus color of the “horizontal list” element is “red”

The indication domain=“com.bmw.” in the XML prototype language for the binary description of the graphic “horizontal list” element 101, 201, 301 means that all “horizontal list” elements of the “com.bmw.” domain have the properties of the “horizontal list” element indicated in the prototype; that is, that the focus color in the graphic “horizontal list” elements 101, 201, 301 is “red”, which is indicated by the reference numbers 102, 103, 202, 203, 302 and 303. Thus, in FIG. 1, the actual selection range “FM” 102 of element 101 and the scope of the selected but not yet acknowledged selection range “satellite radio” 103 is “red”. A corresponding situation applies to selection ranges 203 and 303.

The range of the effect of the prototype or its defining of the properties of the graphic element produced by using the prototype is limited by the indication of the domain for which the prototype is to develop its effect. A first prototype may apply to the same element in one domain and another prototype may apply to another domain. If required, the graphic element may have different properties in the two domains.

In this embodiment, the entire MMI with all menus is defined as the “com.bmw.” domain (main group). The entertainment range of the MMI is defined as the “com.bmw.entertainment” domain. It is therefore a subgroup of the main group. The CD range of the MMI is defined as the “com.bmw.entertainment.cd” domain. It is therefore a subgroup of the subgroup or of the “entertainment” domain. The radio range of the MMI is defined as the “com.bmw.entertainment.radio” domain. This is therefore another subgroup of the subgroup or of the “entertainment” domain.

If the focus color of the graphic “horizontal list” elements 101, 201, 301 is to be changed from “red” to “green”, the prototype will be changed as follows:

```
<!- - ++++++++++++++++++++++++++++++++++++++++++++++++++++++
                                                  MmiListHorizontal
            ++++++++++++++++++++++++++++++++++++++++++++++++++++++ -- >
<prototype uimsGUITupe=”MmiListHorizontal” domain=”com.bmw”>
   <propertyCollection>
      <location x=”0.0” y=”0.0”/>
      <size width=”400.0” height=”30.0”/>
      <! additional properties are indicated at this point which
were,
however, omitted for a simplified representation -- >
      < ! - focus is set to green - - >
      <propertycolor          red=”0”     green=”255” blue=”0”
      name=”colorSelected”/>
   </propertyCollection>
</prototype>
```

As a result of the single change of “<propertyColor red=“255” green=“0” blue=“0” name=“colorSelected”/> to <propertyColor red=“0” green=“255” blue=“0” name=“colorSelected”/> in the binary description of the graphic “horizontal list” element or in the prototype, the focus color changes correspondingly from red to green.

Figure 4:
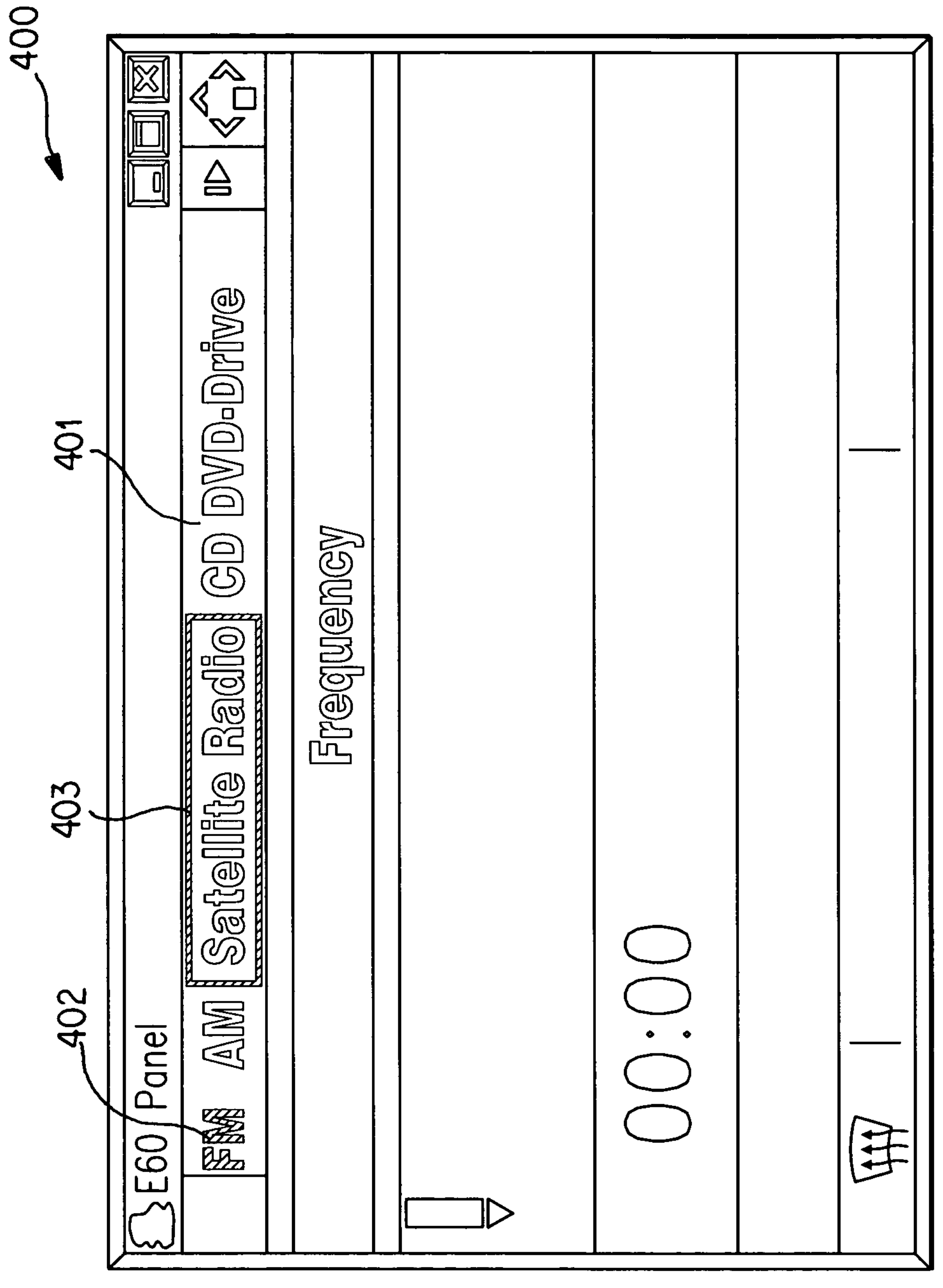
FIG. 4 is a view of the entertainment menu of the MMI, in which the focus color in the “horizontal list” element was changed from “red” to “green”

FIGS. 4 to 7 show the result of the change. FIG. 4 differs from FIG. 1 in that the “FM” selection range 402 and the scope of the “satellite radio” selection range 403 are no longer “red” but are now “green”. With the exception of the color change, the graphic “horizontal list” element 401 corresponds to element 101.

Figure 2:
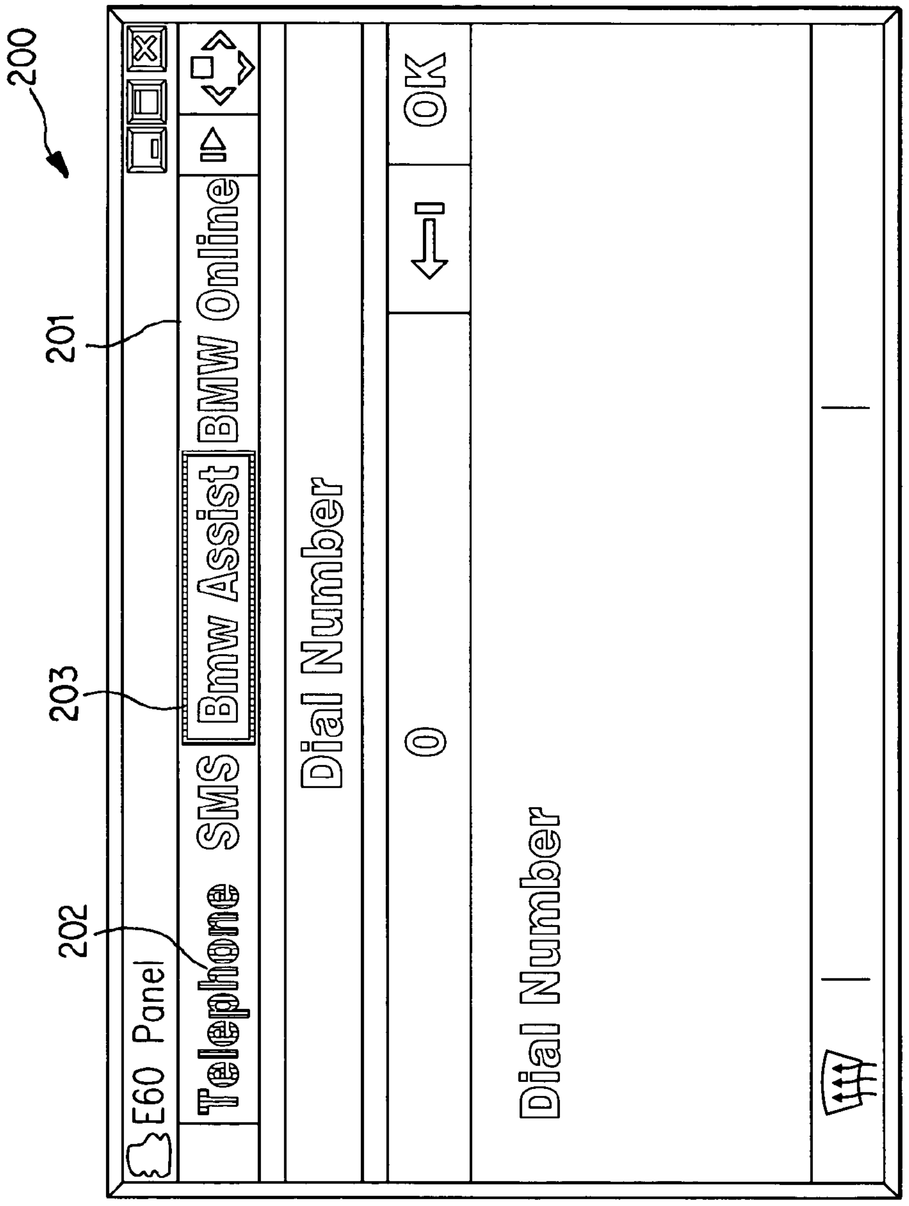
FIG. 2 is a view of a communication menu of an MMI, in which the focus color of the “horizontal list” element is “red”
Figure 5:
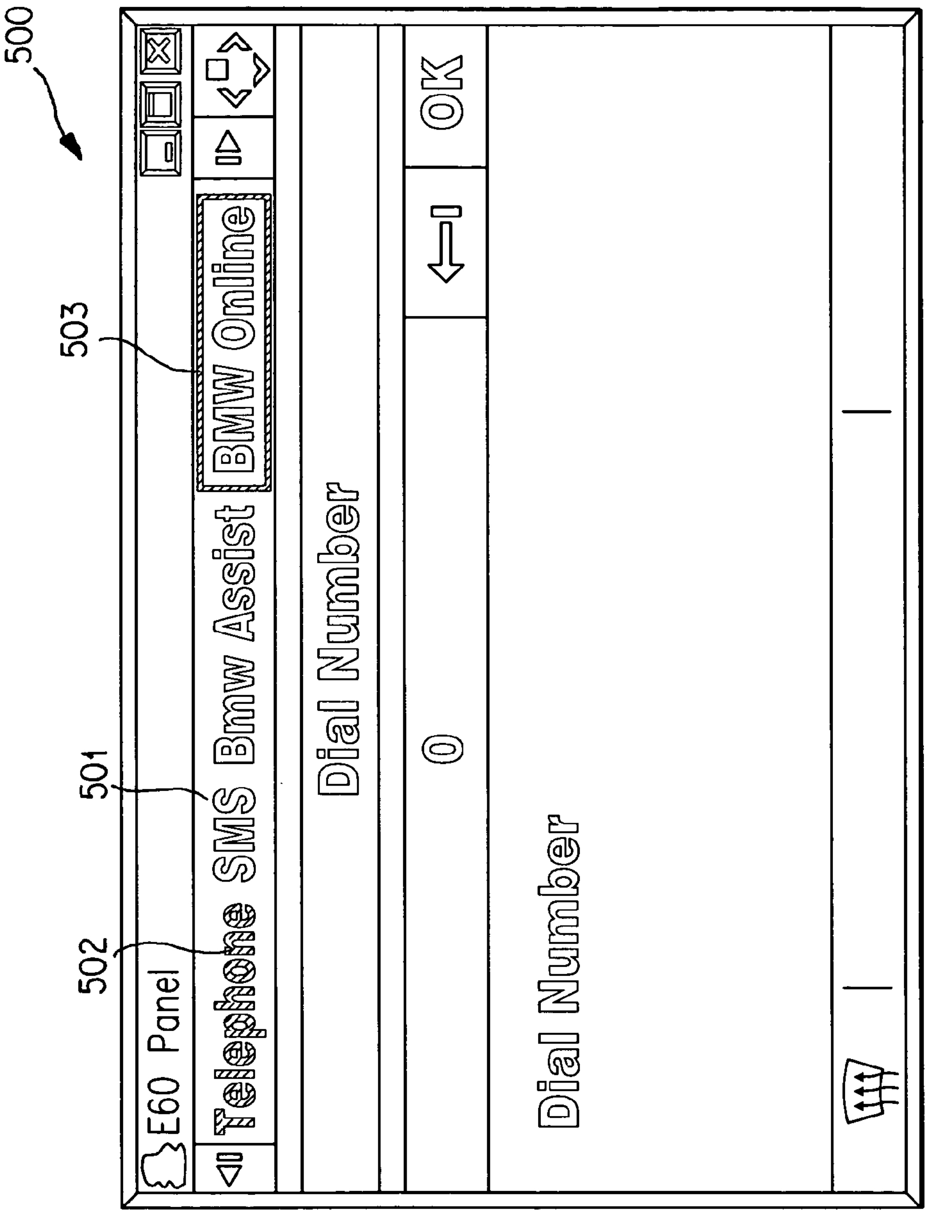
FIG. 5 is a view of the communication menu of the MMI, in which the focus color in the “horizontal list” element was changed from “red” to “green”

FIG. 5 differs from FIG. 2 in that the “telephone” selection range 502 and the scope of the “BMW Online” selection range 503 are no longer “red” but are now “green”. The graphic “horizontal list” element 501 corresponds to element 201 with the exception of the color change.

Figure 3:
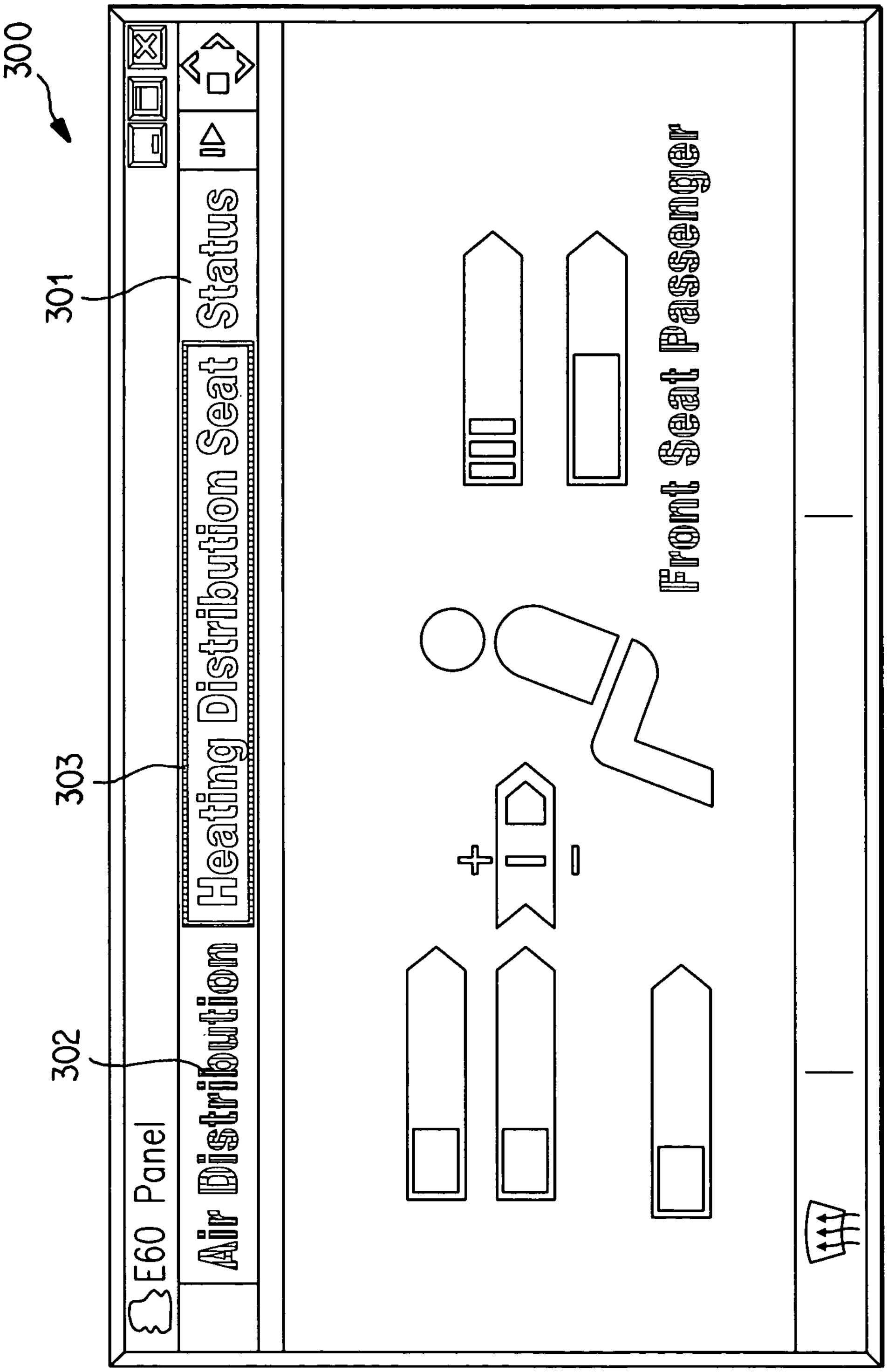
FIG. 3 is a view of an air-conditioning menu of an MMI, in which the focus color of the “horizontal list” element is “red”

FIG. 6 differs from FIG. 3 in that the “air distribution” selection range 602 and the scope of the “heating distribution seat” selection range 603 are no longer “red” but are now “green”. With the exception of the color change, the graphic “horizontal list” 601 element corresponds to element 301.

The purpose of FIG. 7 is to show that the color change of the graphic “horizontal list” element is visible not only in the screen shots of menus 100 to 600, but also in all other menus. In this case, it is naturally a prerequisite that the concerned menu contain the graphic “horizontal list” element. If this is so, as illustrated in FIG. 7 showing the “Top 8” menu of the communication menu 700, the color of the current “Top 8” selection range, position 702, of the graphic “horizontal list” element 701 and the scope of the selected but not yet acknowledged or actuated “selection repetition” selection range 703 changes from “red” to “green”.

Summarizing, the present invention establishes XML descriptions of a graphic surface of MMI systems by way of the mechanism of the so-called prototypical inheritance.

In this case, the graphic element to be specified is first partially predefined by way of one or more prototypes. The actual element then inherits the properties of the prototypes.

If the number of the prototypes is smaller than that of the inheriting elements, a significantly more maintenance-friendly and more compact description of graphic surfaces is obtained than by use of conventional XML descriptions.

The range of the effect of the prototypes can be limited by way of domain indications. Several prototypes for the same element may also be defined for different domains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing at least one of a graphic user and display surface on a display for a man/machine interface of a motor vehicle, the method comprising the acts of:

forming a hierarchically structured menu displayable on the display of the man/machine interface, wherein the menu comprises a main group and at least one subgroup below the main group or below a subgroup ranking below the main group;

assigning each of the graphic elements to the main group, or to one of the subgroups; and passing one or more display properties of the graphical elements across the hierarchically structured menu’s subgroups of the man/machine interface to provide graphical changes to one or more corresponding display properties of each graphic element which is assigned to the hierarchically structured menu’s subgroups, wherein the main group and the at least one subgroup each indicate properties of the graphic elements assigned thereto, a graphic element of a subgroup, in addition to the properties indicated in the subgroup, at least predominantly also having the properties indicated in the main group, and wherein at least one property of the display properties indicated in the main group is indicated in a subgroup in a manner deviating from the main group, and a graphic element assigned to the corresponding subgroup has the deviating property.

2. The method according to claim 1, wherein a property of the graphic elements assigned to the main group and the at least one subgroup includes a color.

3. The method according to claim 1, wherein at least one of the display properties of the graphic element is indicated in the main group, including at least one of:

a size of the graphic element, bit maps which the graphic element uses, distances related to the graphic elements, special element properties of the graphic elements, texts related to the graphic element, and a color of the graphics elements.

4. The method according to claim 3, wherein the size of the graphic element comprises a height, a width, a radius or type size of a label of the graphic element, or a combination thereof;

wherein the bit maps which the graphic element uses comprise a background and foreground, each being focused, selected, deactivated, or a combination thereof, arrows for scrolling, or focus indications;

wherein the distances comprise individual bit maps with respect to one another, individual bit maps relative to origin, individual text relative to the origin, or a combination thereof;

wherein the special element properties comprise a contracting capacity of the graphic element when not focusing, whether the graphic element is selectable, focused, a scaling of bit maps, offsets of scrolling or offsets of scrolling parameters of the graphic element;

wherein the text comprises a text alignment, including one of whether the texts are right-aligned, left-aligned, and centered, or a font of the text; and wherein the color comprises a background color, a focus color, a text color, a selection color, a focusing color or a deactivating color.

5. The method according to claim 1, wherein the graphic elements are formed on a basis of binary data elements describing the graphic elements, and each binary data element is provided with an assignment indication as to which main group or subgroup the graphic element is assigned.

6. The method according to claim 5, wherein at least one of the graphic elements are described by data elements in extensible markup language (XML); and the assignment of the binary data element takes place by indicating a domain as the main group and by indicating a subdomain as the subgroup, respectively.

7. The method according to claim 6, wherein the graphic elements are displayed by using an XML-data-processing browser.

8. The method according to claim 1, wherein the graphic elements are described by binary data elements in an object-oriented programming language.

9. The method according to claim 8, wherein the object-oriented programming language is Java or C++.

10. The method of claim 1, wherein the graphic elements are assigned to the main group or to a particular one of the subgroups based at least in part on being functionally related to each other.

11. A display device for a man/machine interface in a motor vehicle, wherein the display device comprises a display and is configured to:

display a hierarchically structured menu on the display, wherein the hierarchically-structured menu comprises a main group and at least one subgroup below the main group or below a subgroup ranking below the main group;

assign each of the graphic elements to the main group, or to one of the subgroups; and pass one or more display properties of the graphical elements across the hierarchically structured menu's subgroups of the man/machine interface to provide graphical changes to one or more corresponding display properties of each graphic element which is assigned to the hierarchically structured menu's subgroups, wherein the main group and the at least one subgroup each indicate properties of the graphic elements assigned thereto, a graphic element of a subgroup, in addition to the properties indicated in the subgroup, at least predominantly also having the properties indicated in the main group, and wherein at least one property of the display properties indicated in the main group is indicated in a subgroup in a manner deviating from the main group, and a graphic element assigned to the corresponding subgroup has the deviating property.

12. The display device of claim 11, wherein the graphic elements are assigned to the main group or to a particular one of the subgroups based at least in part on being functionally related to each other.

* * * * *